United States Patent
Lin et al.

(10) Patent No.: US 6,181,849 B1
(45) Date of Patent: Jan. 30, 2001

(54) INTERLEAVED WAVELENGTHS MULTI/ DEMULTIPLEXER WITH MULTIPLE-INPUT-PORTS AND MULTIPLE-OUTPUT-PORTS FOR WAVELENGTH ADD/DROP WDM SYSTEMS

(75) Inventors: Wenhua Lin, Middletown; Nathan Myron Denkin, Matawan, both of NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/302,373

(22) Filed: Apr. 30, 1999

(51) Int. Cl.[7] ....................................................... G02B 6/28
(52) U.S. Cl. ............................ 385/24; 385/31; 385/37; 385/46; 359/130
(58) Field of Search .................. 385/24, 31, 44, 385/37, 46, 43, 42; 359/124, 130, 127

(56) References Cited

U.S. PATENT DOCUMENTS

| | | | |
|---|---|---|---|
| 5,002,350 | 3/1991 | Dragone | 350/96 |
| 5,546,483 * | 8/1996 | Inoue et al. | 385/14 |
| 5,680,490 | 10/1997 | Cohen et al. | 385/24 |
| 5,862,279 | 1/1999 | Amersfoort | 385/40 |
| 5,864,413 | 1/1999 | Feldman | 359/125 |
| 5,889,906 | 3/1999 | Chen | 385/28 |
| 5,946,331 * | 8/1999 | Amersfoort et al. | 372/23 |
| 6,049,640 * | 4/2000 | Doerr | 385/15 |

* cited by examiner

Primary Examiner—Phan T. H. Palmer
Assistant Examiner—Benjamin Cushwa
(74) Attorney, Agent, or Firm—Dickstein Shapiro; Morin & Oshinsky, LLP

(57) ABSTRACT

The present claimed invention improves on the conventional comb and multiple router approach by making multiple use of a single router by using interleaved groups of wavelengths that enter through different entrance ports and exit through different groups of exit ports of the same router. This permits better separation (lower crosstalk) between adjacent channels, greatly reduced temperature sensitivity, small physical size and lower cost. With these improvements, a large number of wavelength add/drop sites may be cascaded in WAD/WDM systems.

12 Claims, 7 Drawing Sheets

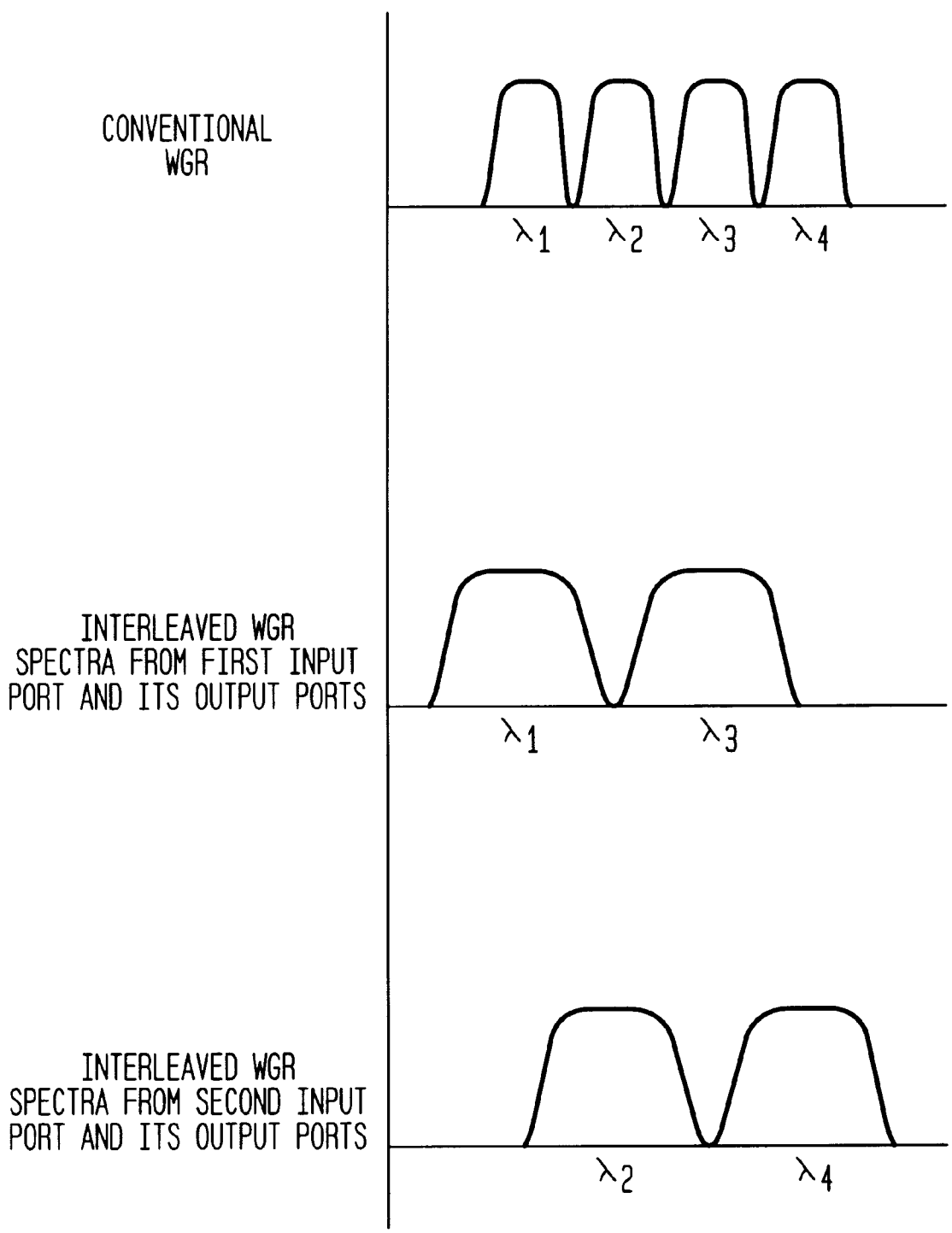

US 6,181,849 B1

INTERLEAVED WAVELENGTHS MULTI/DEMULTIPLEXER WITH MULTIPLE-INPUT-PORTS AND MULTIPLE-OUTPUT-PORTS FOR WAVELENGTH ADD/DROP WDM SYSTEMS

BACKGROUND OF THE INVENTION

1. Field of the Invention

This invention relates to optical fiber communications transmission networks, and more particularly, relates to a comb splitting system and a method for multiplexing or demultiplexing a plurality of optical bands each containing a plurality of individual channels at different wavelengths.

2. Description of the Related Art

There are several network approaches for implementing optical communication networks between central offices and individual subscribers. These include for example point-to-point networks, power splitting networks, and wavelength division multiplexing networks. In a point-to-point network, one or more optical fibers directly link the central office to each subscriber. In a power splitting network, a transmitter, receiver, and part of an optical fiber in the subscriber loop is shared by many subscribers using power splitters, a wide variety of which are well known in the art. See for an example, U.S. Pat. No. 4,904,042 to Dragone that describes a star coupler, which is a typical power splitter (PS).

A third approach is a wavelength division multiplexing network that employs wavelength division multiplexers (WDM). In this approach, a particular channel (wavelength of carrier) is allocated to each subscriber. Various channels are multiplexed over a single optical fiber and are demultiplexed onto individual fibers associated with each subscriber to create a virtual point-to-point network. A WDM sometimes referred to as a filter or router, is well known in the art and is generally a device that can multiplex and/or demultiplex optical signal wavelengths.

In general, a WDM is usually a passive optical network (PON) element or device with multiple optical paths, each of which exhibits a particular passband, similar to an electrical signal processing filter. The passband permits passage of one or more particular wavelengths along the respective optical path, to the substantial exclusion of others. Thus, the WDM can be used to divide wavelengths of incoming light from a multichannel optical signal or to combine various wavelengths on respective optical paths into one multichannel optical signal on one optical path. For an example of a WDM, see C. Dragone et al., "Integrated Optics N×N Multiplexer on Silicon," IEEE Photon. Techno. Lettr., Vol. 3, p. 896 (1989), the disclosure of which is also set forth in U.S. Pat. No. 5,136,671 to Dragone.

As shown in FIG. 1, a Wavelength add and drop (WAD) site consists of an optical path 3 that carries a multichannel optical signal (light) 5. The multichannel optical signal is sent to an optical demultiplexing unit (ODU) 8 which separates the light into various wavelengths (channels) and outputs optical signals into individual predetermined wavelengths (channels) 9, 11, 13. In reverse, the optical multiplexing unit (OMU) 7 combines the multiple incoming signals (channels) into a single multichannel optical signal 5 in a single optical path 3. Various WAD sites 1 may be provided in a cascade network, as shown in FIG. 1, to provide a virtual point-to-point or a ring system.

FIGS. 2 and 3 show a conventional OMU 7 and ODU 8, also referred to as a waveguide grating router (WGR), with an input side 17 and an output side 19. The ODU 8 is composed of an array of single mode waveguides 29 and input 21 and output 23 waveguides connected by two planar slab waveguides 18 and 20. The principles of multiplexing and demultiplexing of the OMU 7 and the ODU 8 are the same, except that light propagation direction is reversed. Light 5 with a plurality of wavelengths 9, 11, 13 is received by the single mode input waveguide 21 and diffracts horizontally in the slab waveguide region 18. Each wavelength propagates through the individual array waveguides 29 and experiences a constant and wavelength-dependent phase shift caused by the path difference. Thus, the phase shift produces a wavelength dependent wavefront tilting, so that light convergence in the output slab waveguide 20 is wavelength dependent. Since every output waveguide 23 is arranged on a circle with radius R/2 (R is shown as 33) and is directed at the center of the output array waveguides, the different wavelength channels in the input light are focused along the focal plane of the output aperture and couple into different output waveguides 23.

Light coupled into the input waveguide 21 and emitted from the WGR must satisfy the grating equation $$dn_s \sin\theta_i + dn_s \sin\theta_o + n_c \Delta L = m\lambda$$

where $\theta_i$ and $\theta_o$ are the diffraction angles at the input 18 and output 20 slabs, respectively; $\Delta L$ is the constant optical path length difference between neighboring array waveguides 29; $n_s$ and $n_c$ are effective refractive index of the slab and channel waveguide, respectively; d is the grating pitch 31; and m is the diffraction order and is an integer.

The spatial dispersion is given by $$\frac{dx}{d\lambda} = \frac{Rm}{n_s d} \frac{n_g(\lambda)}{n_c}$$

where the group refractive index $n_g$ is defined according to $$n_g(\lambda) = n_c - \lambda \cdot dn_c/d\lambda$$

Since the arrayed grating provides liner dispersion in the wavelength along the focal plane of the output aperture, WDM wavelengths are separated by a distance $\Delta\lambda \, dx/d\lambda$ along the focal plane at the output angular spacing $$\Delta\theta_o = \frac{\Delta\lambda}{dn_s} m$$

where $\Delta\lambda$ is the channel spacing.

The waveguide grating device (WGR) 7 may contain different input and output angular spacings (i.e., $\Delta\theta_i \neq \Delta\theta_o$), which means that asymmetrical I/O-port design will yield different demultiplexed wavelengths when a signal is input from different input port and is output from different output port. Under this design, the center wavelength of a WGR device can be adjusted by inputting the multiplexed signal at an off-center port. This is referred as the Vernier effect. The proper I/O-port angular ratio and a number of dummy input and output ports 22 can be chosen to compensate the center wavelength offset due to material and processing variations. When the multiplexed signal is input at the i-th port, the demultiplexed wavelength at j-th port is given by $$\lambda_{i \to j} = \lambda_o + (i + j/R_v)\Delta\lambda$$

where $R_v$ is defined as Vernier ratio between the two angular separations at the output port and input port by $$R_v = \Delta\theta_o/\Delta\theta_i$$

When the output port j=−i, the center wavelength can be shifted by $$\Delta\lambda_o = i(1 - 1/R_v)\Delta\lambda$$

Δλ is unchanged, but the center wavelength and the all-wavelength comb are tuned, based on the designed $R_v$.

A practical WDM network, favors a two stage split of channels that first splits a multichannel optical signal into two channels. Each channel is subsequently demultiplexed into individual channels using a WGR. As shown in U.S. Pat. 5,680,490, by Cohen and Li, a comb splitting system and method for implementing a multistage WDM network are provided for a two-stage split.

The problem with such conventional two-stage splitting systems is that each splitting and combining device (WGR) requires separate environmental controls. This would cause each set of wavelength shifts from each other, which would result in crossed traffic. Thus, while a two stage split is preferable, it is not preferable to have multiple WGRs, one for each secondary split. Additional devices result in increased cost and complexity.

The present claimed invention is directed to further improving such devices by providing an interleaved multichannel WGR that may be used in a two-stage split.

SUMMARY OF THE INVENTION

The present claimed invention improves on the conventional comb and multiple router approach by making multiple use of a single router.

The present claimed invention provides a practical interleaved router that has at least two input ports and multiple (N) outputs. A 2×N implementation of this integrated device can be used in the second stage of a two-stage splitting system, but is not limited thereto.

Compared with the conventional systems, the integrated 2×N WGR and its based WAD systems have at least the following advantages:

1. By dividing the optical spectrum on one fiber into two interleaved sets of N/2 channels (N/2 odd channels on one fiber and N/2 even channels on another fiber), an integrated two input port and N output-port (2×N) WGR is capable of providing accesses to N channels.
2. This approach provides a N/2 channel start up capability with a growth increment for the next N/2 channels. The second set of N/2 channels can be installed for expansion later without affecting the transmission of the first set of N/2 channels. In addition, the WAD site can be provisioned to provide access to either N/2 or N channels.
3. The present invention has an increased bandwidth when compared to convention 1×N designs and thus is capable of an increased number of cascades.
4. Because the integrated 2×N WGR shares one arrayed-grating the odd channels and even channels do not shift from each other.
5. Similarly, N channels can be divided into N/m channels (where m=2,4, . . . ) Thus, providing for a modular and growable system that has the capacity for upgrade.
6. The same or even better performance can be obtained with smaller physical size and lower cost.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 6 is a chart comparing the bandwidth differences between a 1×N ODU and a 233 N WGR;

DETAILED DESCRIPTION OF PREFERRED EMBODIMENTS

The present invention provides an interleaved WGR (router) with at least two input ports and multiple (N) output ports. The present invention may be used in a two-stage wavelength demultiplexing multiplexing (WDM) system shown in FIG. 4, but is not limited thereto.

Figure 1:
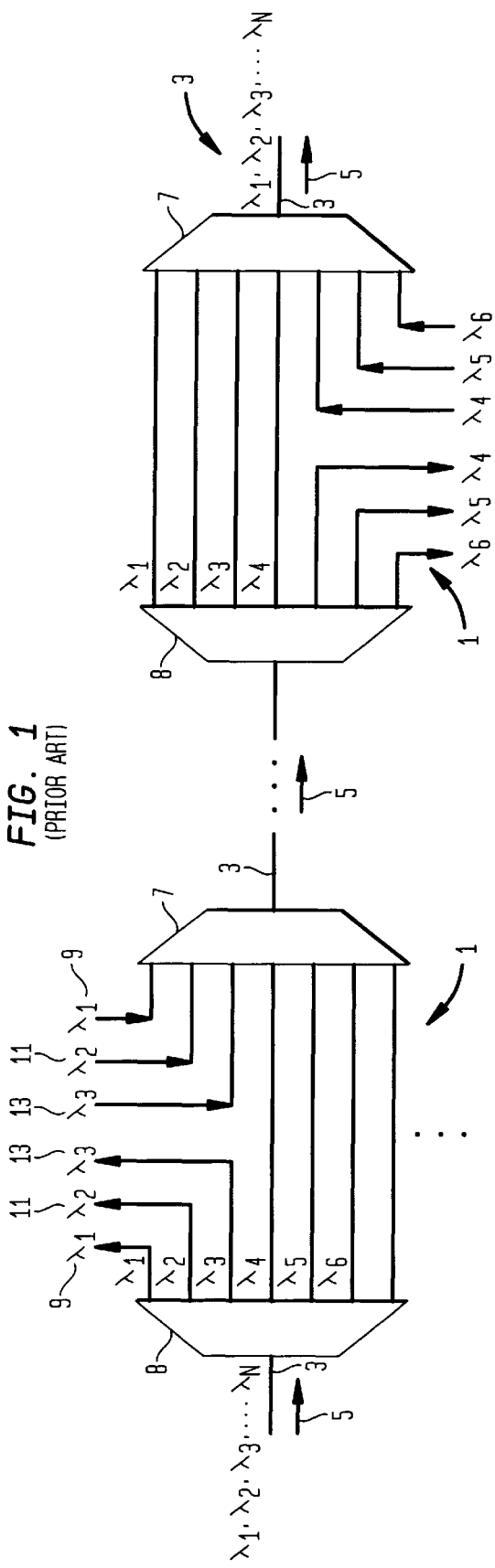
FIG. 1 is a schematic diagram of a prior art wavelength add and drop (WAD) site.
Figure 4:
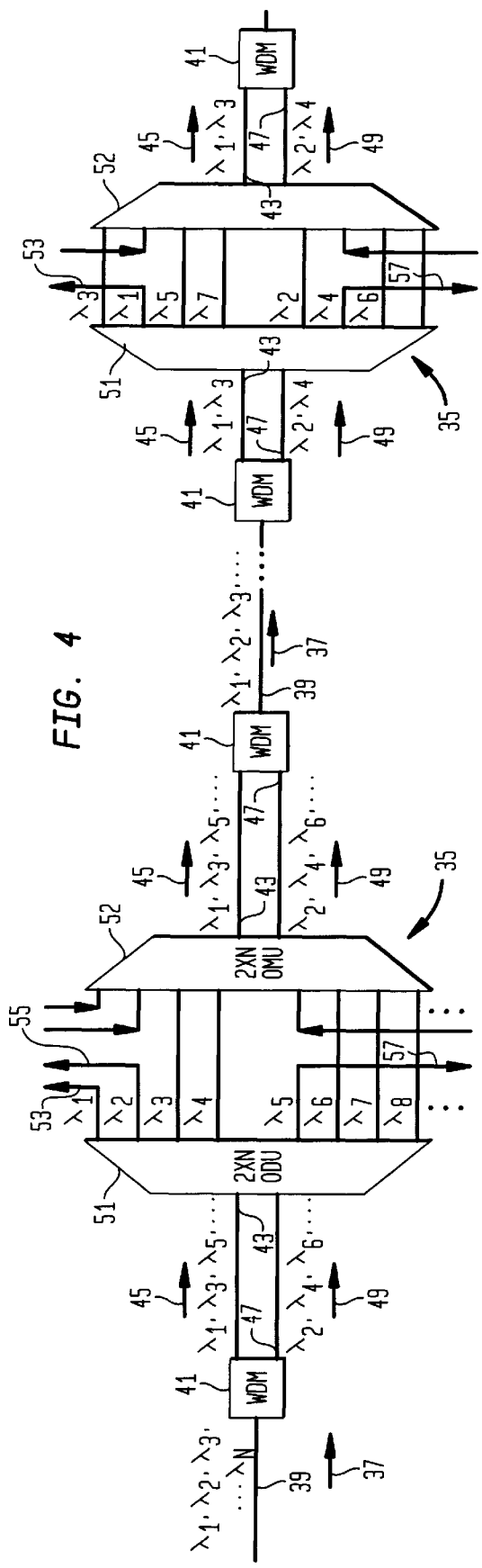
FIG. 4 is a schematic diagram of a two-stage WAD site using a 2×N waveguide grating (WGR) constructed in accordance with a first embodiment of the present invention.
Figure 2:
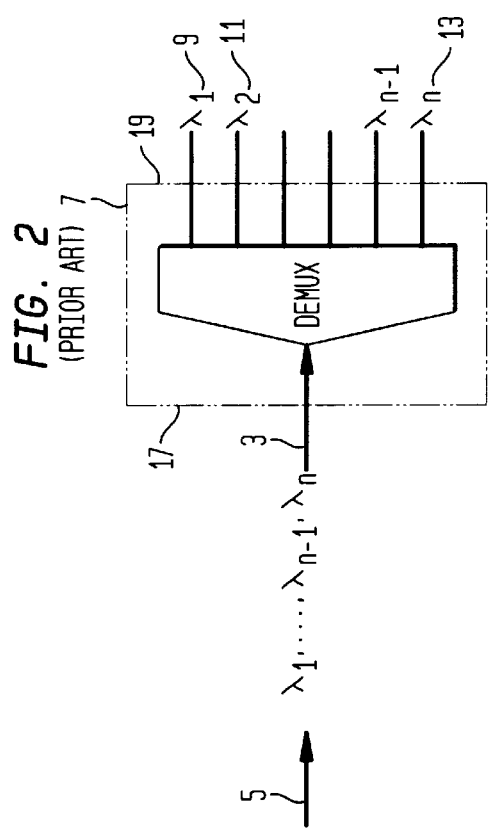
FIG. 2 is a schematic diagram of an optical demultiplexing unit (ODU) used in a WAD site.
Figure 3:
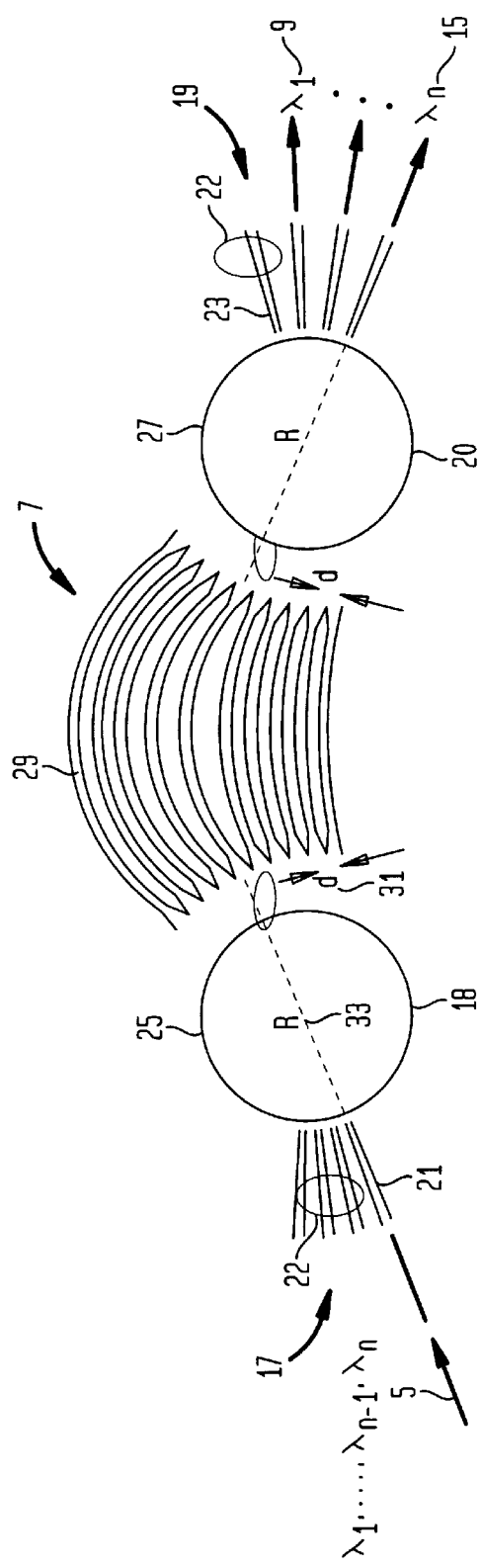
FIG. 3 is a schematic diagram showing in the operations of the ODU shown in FIG. 2.

As shown in FIG. 4, a wavelength add/drop site (WAD) 35 is provided that receive multichannel optical signals 37 over a single optical line 39 which are separated using a wavelength demultiplexer (WDM) 41 into two interleaved sets of wavelengths 45 and 49, which are respectively carried on two optical lines 43 and 47. The two interleaved multichannel signals 43 and 47 are input into a 2×N WGR integrated device 51 and demultiplexed into channels 53, 55 and 57 respectively. The WAD site using a 2×N WGR integrated device multiplex in a similar manner, as those of ordinary skill in the art will appreciate. Although the present invention will be described using a 2×N design, those of ordinary skill in the art will recognize that an N×N design is possible, including a 4×N, an 8×N design and so on.

Figure 5A:
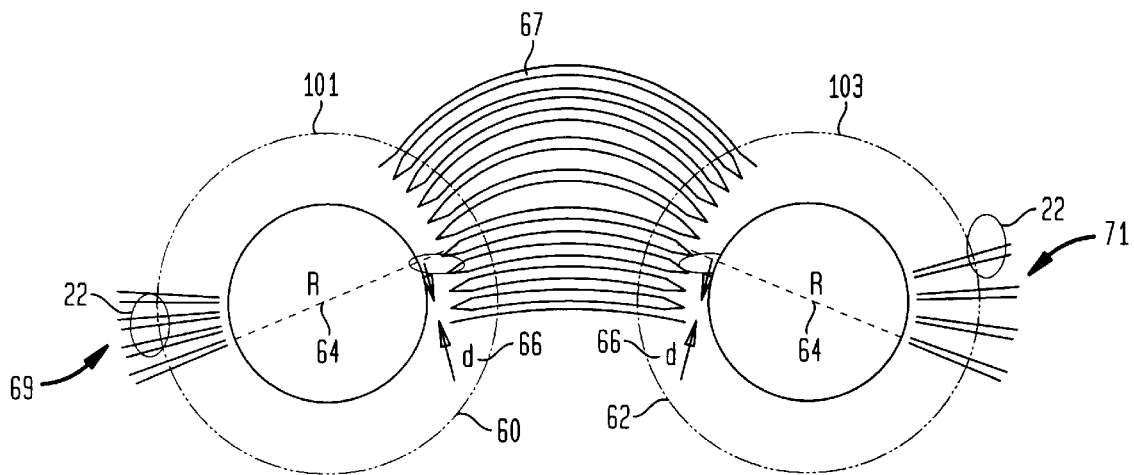
FIGS. 5a, 5b and 5c are schematic diagrams showing the operation of the 2×N WGR of FIG. 4.
Figure 5B:
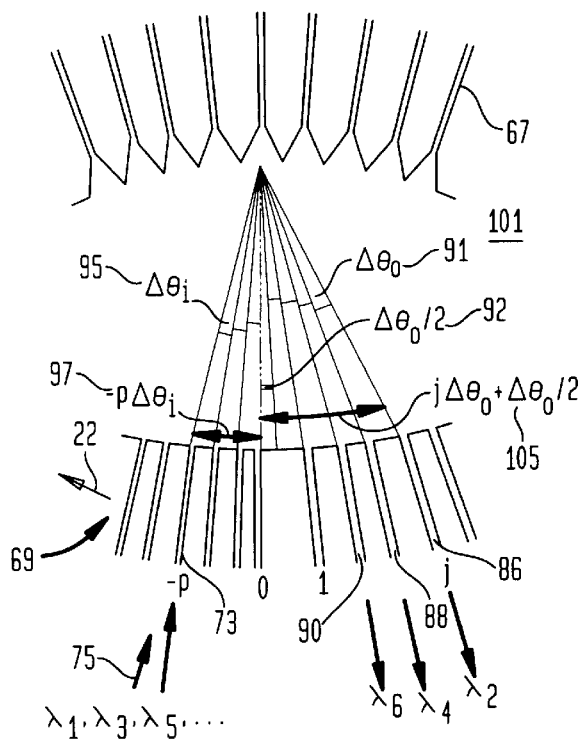
Figure 5C:
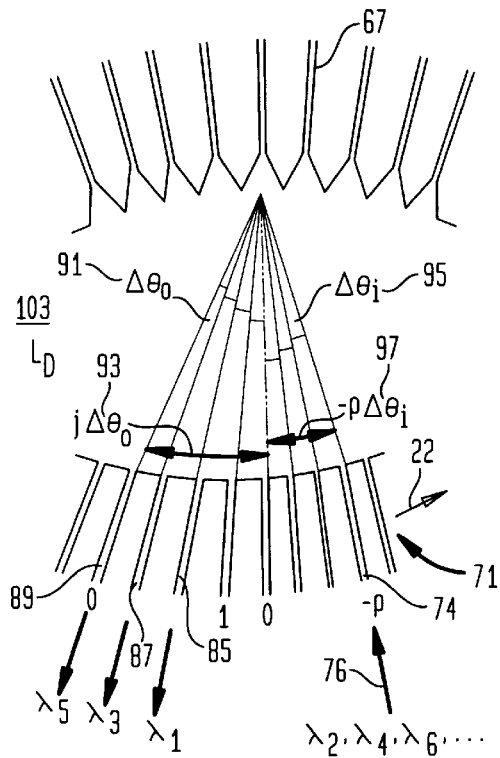

As shown in greater detail in FIGS. 5a, 5b and 5c the WGR integrated device has two sets of the input waveguide ports 73 and 74 on opposite sides 69 and 71 of the same arrayed grating waveguides 67. Each input waveguide port 73 and 74 has respective output waveguide ports 85, 87, 89 and 86, 88 and 90 on an opposite side of the arrayed grating waveguides 67 relative to its respective input port. The input and output waveguide ports 73, 74, 85, 86, 87, 88, 89 and 90 are arranged on a circle with radius R 64. In addition, a first slab waveguide coupler 60 and a second slab waveguide coupler 62 are provided. Vernier tuning ports 22 are also provided.

Light 75 with a plurality of odd wavelengths $\lambda_1, \lambda_3, \lambda_5$ . . . (with channel spacing 2Δλ) is launched into the first input waveguide port 73. The light 75 is demultiplexed into individual output ports 85, 87 and 89 with wavelengths $\lambda_1$, $\lambda_3, \lambda_5$ . . .

Similarly, light 76 with a plurality of even wavelengths $\lambda_2, \lambda_4, \lambda_6$ . . . (with channel spacing 2Δλ) may be launched into the second input waveguide port 74 and demultiplxexed into individual output waveguide ports 86, 88 and 90 with wavelengths $\lambda_2, \lambda_4, \lambda_6 \ldots$. Thus, a 2×N WGR (router) with two input waveguide ports can be used to demultiplex two sets of interleaved wavelengths 75 and 76 into two N/2 channels with channel space $2\Delta\lambda$.

Although only three output waveguide ports and wavelengths per side are shown herein, the present invention may use multiple combinations of wavelengths and output waveguide ports. In addition, the use of the terms odd wavelengths and even wavelengths is not meant to be limited to any particular wavelength or group of wavelengths but is meant to express interleaved wavelengths.

For the first input waveguide port 73, the input waveguide has $\theta_i=(-p\Delta\theta_i)$ degree diffraction angle at the slab waveguide coupler 60, where p is an integer and is the input number relative to the central port, and $\Delta v_i$ is the constant angular spacing value 95. The sign, whether negative (–), zero (0) or positive (+), is defined with respect to which side of the centerline of the waveguide array 67 the angle is being formed in relationship to. Those of ordinary skill in the art will recognize that this may be changed and that any equation modified accordingly. A set of output waveguide ports 85, 87 and 89 have the constant angular spacing $\Delta\theta_o$ 91 which corresponds to a set of output odd wavelengths $\lambda_1, \lambda_3, \lambda_5 \ldots$. For the first input port 73 and its corresponding output ports 85, 87 and 89 the following grating equation can be obtained as:

$$dn_s\sin(-p\Delta\theta_i)+dn_s\sin(j\Delta\theta_o)+n_c\Delta L=m\lambda_{odd} \qquad \text{Eq. (1)}$$

and constant angular spacing $\Delta\theta_o$ 91 satisfies $$\Delta\theta_o = \frac{2\Delta\lambda}{dn_s}m \qquad \text{Eq. (2)}$$

where j is output port numbering relative to the central port; $n_s$ and $n_c$ are effective refractive index of the slab and channel waveguide, respectively; $\Delta L$ is the constant optical path length difference between neighboring array waveguides 67; d 66 is the grating pitch; and m is the diffraction order and is an integer. Equation (2) indicates that the each output port corresponds to the double channel spacing.

In the first embodiment shown in FIGS. 5a, 5b and 5c, the same input port design is used for the second input port 74 but all of the output ports corresponding thereto 86, 88 and 90 are shifted by a constant angle (which corresponds to a channel spacing $\Delta\lambda$ in the wavelength domain). For the second input port 74, the input waveguide has the same $\theta_i$ ($=-p\Delta\theta_i$) degree diffraction angle at the second slab-coupler 62, where p is an integer and $\Delta\theta_i$95 is the constant angular spacing value. A set of output waveguide ports 86, 88 and 90 still have the constant angular spacing $\Delta\theta_o$91 which corresponds to a set of output even wavelengths $\lambda_2, \lambda_4, \lambda_6 \ldots$, but each output has a $\Delta\theta_o/2$ constant angular shift 97 to the positive channel side relative to the central zero line of the grating. The second input waveguide port 74 and its corresponding output waveguide ports 86, 88 and 90 satisfy the following grating equation $$dn_s\sin(-p\Delta\theta_i)+dn_s\sin(j\Delta\theta_o+\Delta\theta_o/2)+n_c\Delta L=m\lambda_{even} \qquad \text{Eq. 3}$$

and constant angular spacing $\Delta\theta_o$91 satisfies the same equation (2). $-p\Delta\theta_i$ is illustrated at 97 in FIGS. 5b and 5c.

$j\theta_o+\Delta\theta_o/2$ is illustrated at 105. $j\Delta\theta_o$ is illustrated at 93. $\Delta\theta_o/2$ is illustrated at 97.

The integrated device shown in FIGS. 5a, 5b and 5c may be manufactured in accordance with known techniques and of known materials for integrated devices. As the present claimed invention is direct to a unique design that provides numerous advantages over prior art designs, the material and method of manufacture is not material to the present invention.

The advantages of the integrated device shown in FIGS. 5a, 5b and 5c are as follows:

For a router, channel spacing can also be obtained as $$\Delta\lambda = \frac{\Delta x_o}{R}\frac{n_s d}{m} \qquad \text{Eq. (7)}$$

Bandwidth $\Delta f_{3dB}$ can be estimated as $$\Delta f_{3dB} = 2\sqrt{\ln 2}\,\omega_0\frac{dn_s}{Rm} \qquad \text{Eq. (8)}$$

Since the entire spectral range is unchanged for 2×N WGR, the free spectral range and grating order m remains unchanged. Compared with the conventional 1×N WGR, the interleaved 2×N WGR has $$\Delta\lambda_{2\times N}=2\cdot\Delta\lambda_{1\times N}$$

so $$R_{2\times N}=0.5R_{1\times N}, \Delta f_{3dB,2\times N}=2\cdot\Delta f_{3dB,1\times N}$$

Thus, the integrated 2×N WGR has small focal length R (resulting in small chip size) and bandwidth that is twice as wide (resulting in less filter narrowing and more cascaded WAD sites), as shown in FIG. 6. This permits better separation (lower crosstalk) between adjacent channels and reduced temperature sensitivity. Compared with a single input port using the same router technology, it is possible to obtain much better channel separation and cascadablity permitting many more add/drop stages in a system.

Figure 7A:
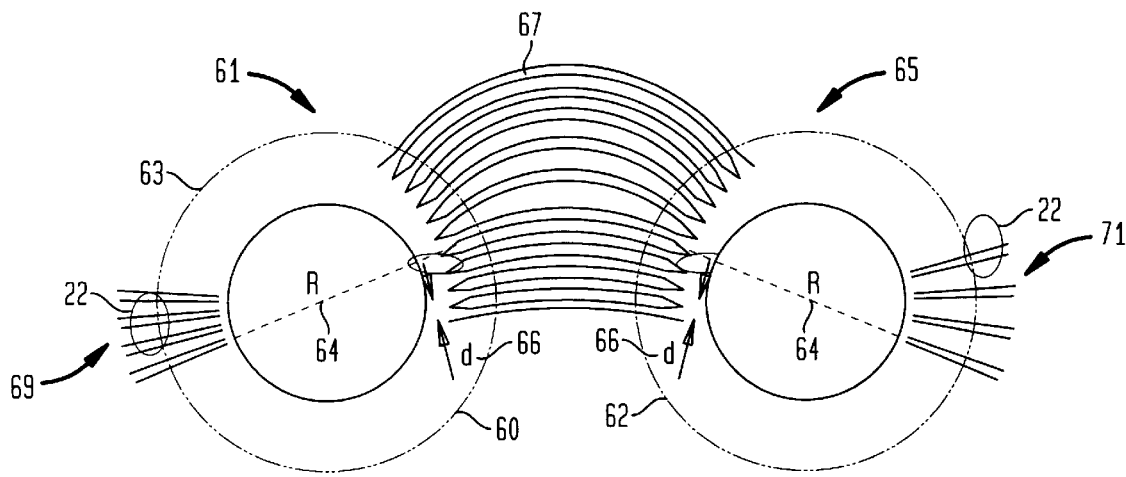
FIGS. 7a, 7b and 7c are schematic diagrams showing the application and operation of a second embodiment 2×N WGR.
Figure 7B:
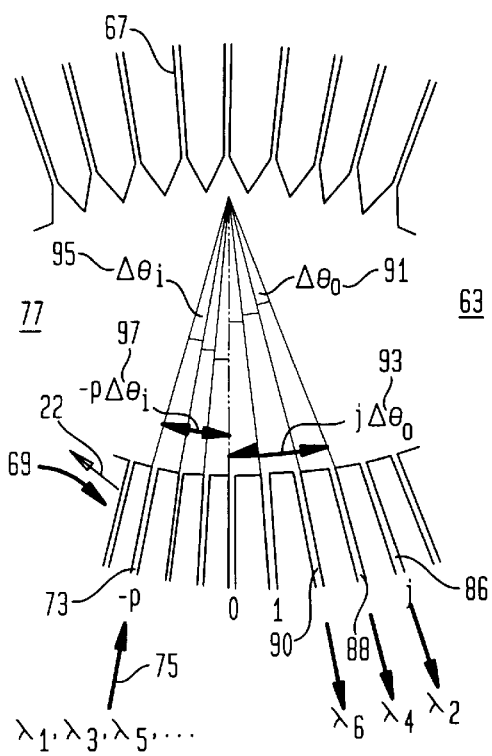
Figure 7C:
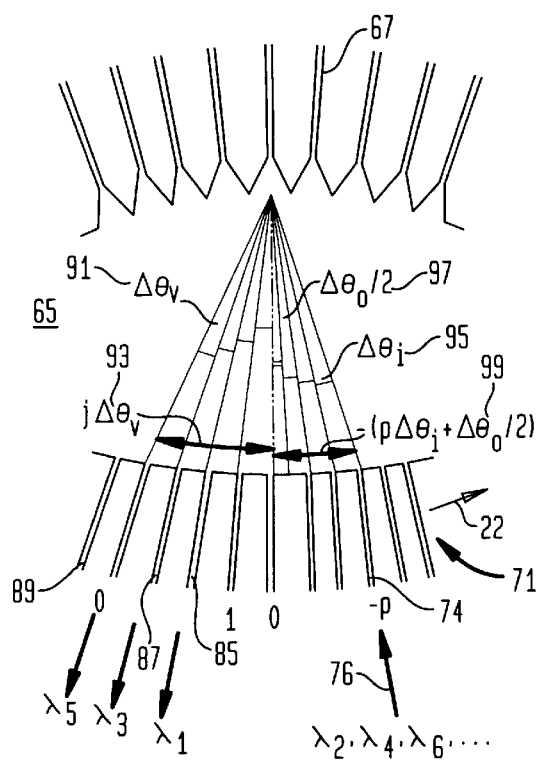

FIGS. 7a, 7b and 7c shows a second embodiment which includes an alternate design for the second input waveguide port 74. The alternate design uses the same waveguide output port design for all waveguide output ports but shifts the waveguide input port 74 by a constant angle which corresponds to a channel spacing $\Delta\lambda$ in the wavelength domain. For the second waveguide input port 74, the corresponding input waveguide has the $\theta_i$ degree diffraction angle 99 at the second slab coupler, where $\theta_i=-(p\Delta\theta_i)+\Delta\theta_o/2$ degree diffraction angle 99 at the second slab coupler 62, which shifts $-\Delta\theta_o/2$ constant angular value 97 relative to the central zero line of the grating. A set of output waveguide ports 86, 88 and 90 have the same constant angular spacing $\Delta\theta_o$ 91 which corresponds to a set of output even wavelengths $\lambda_2, \lambda_4, \lambda_6 \ldots$ The second waveguide input port 74 and its corresponding waveguide output ports 86, 88 and 90 satisfy the following grating equation $$dn_s\sin(-p\Delta\theta_i+\Delta\theta_o/2)+dn_s\sin(j\Delta\theta_o)+n_c\Delta L=m\lambda_{even} \qquad \text{Eq. (9)}$$

and constant angular spacing $\Delta\theta_o$ 91 satisfies the same equation (2).

The same Vernier tuning principle is applied to the wavelength interleaved 2×N router of the invention. A few of additional input waveguide ports 22 and output waveguide ports 22 are designed to compensate for device processing variations. For example, the second input waveguide port has a few additional waveguide input ports and the corresponding waveguide output ports in FIG. 7c. When light with odd wavelengths is launched into the first waveguide input port located at −p-th input port and output from the j-th output port, from equation (4), $$dn_s\sin(-(p\Delta\theta_i+\Delta\theta_o/2))+dn_s\sin(j\Delta\theta_o)+n_c\Delta L=m\lambda_{even} \quad \text{Eq. (13)}$$

When light with odd wavelengths is launched into the second waveguide input port located at −(p+1)-th input port and exits from (j+1)-th output port, the grating equation is $$dn_s\sin(-(p+1)\Delta\theta_i-\Delta\theta_o/2)+dn_s\sin((j+1)\Delta\theta_o)+n_c\Delta L=m\ \lambda'_{even} \quad \text{Eq. (14)}$$

By combining the above two equations, the wavelength shift is determined as $$\delta\lambda_{even}=\lambda'_{even}-\lambda_{even}=dn_s\Delta\theta_o/m(1-\Delta\theta_i/\Delta\theta_o)=2\Delta\lambda(1-1/R_v) \quad \text{Eq. (15)}$$

The same Vernier tuning principle is also applied to the second waveguide input port. Thus, the entire odd wavelength comb and even wavelength comb can be tuned by an incremental amount in a unit of $2(1-1/R_v)\ \Delta\lambda$ through choosing a pair of different I/O-port.

A third and fourth embodiment of the invention is shown in FIGS. 8a, 8b and 8c and FIGS. 9a, 9b and 9c, respectively, in which two sets of the waveguide inputs 73 and 74 are provided on the same side 69 and share the same arrayed grating waveguides 67. The designs for the first input port and second input port are the same as that described above. For the odd wavelength channels, the first input port and its corresponding output ports can be placed based on a constant angular spacing. For the even wavelength channels, either the second input port (as shown in FIGS. 8) or the all output ports (as shown in FIGS. 9) are shifted by $\Delta\theta_o/2$ 125.

Figure 8A:
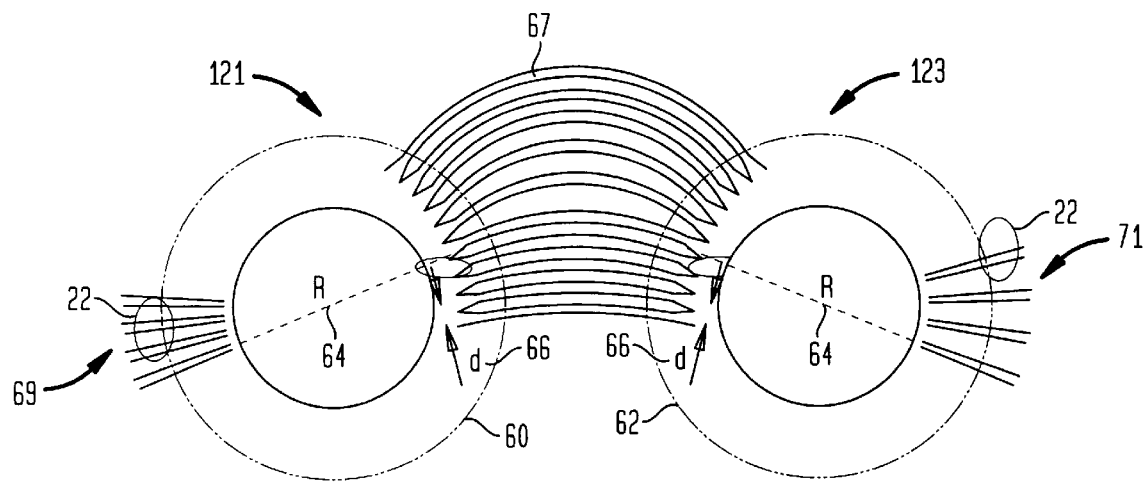
FIGS. 8a, 8b and 8c are schematic diagrams showing the application and operation of a third embodiment 2×N WGR.
Figure 8B:
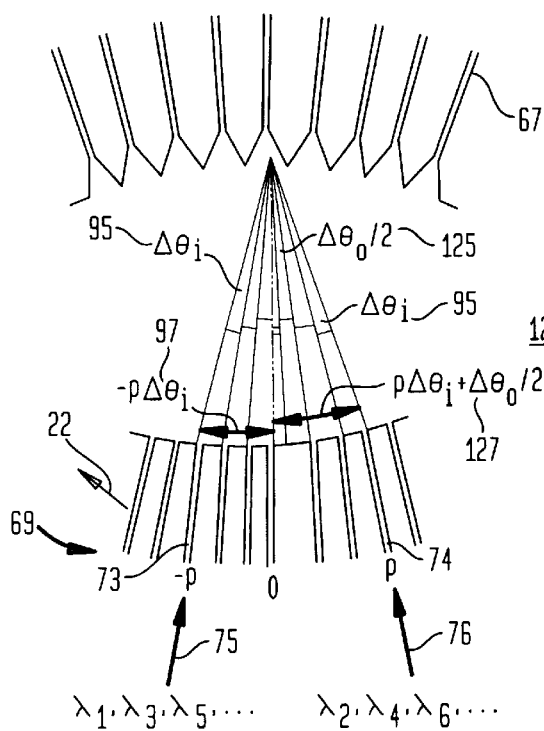
Figure 8C:
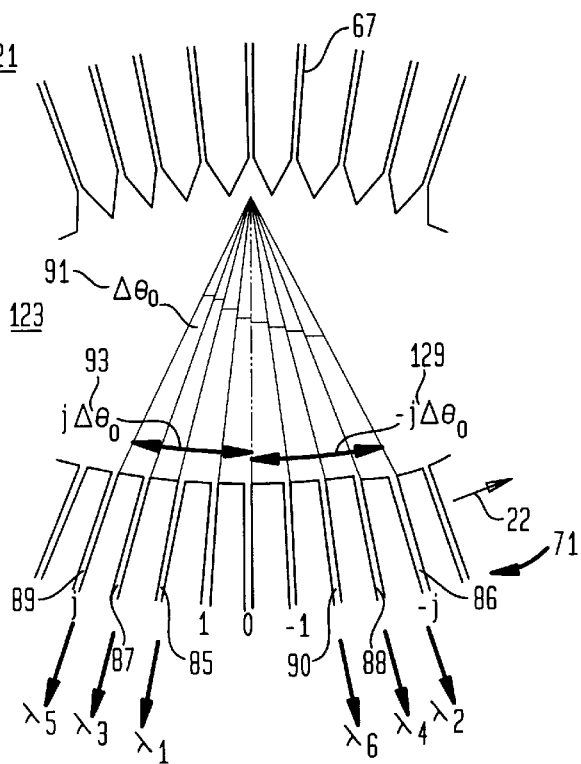

In FIGS. 8a, 8b and 8c, a signal at the odd wavelength 75

$$\lambda_{odd}=\lambda_1+2j\Delta\lambda$$

is inputted at the first input port 73 with input angle $-p\Delta\theta_i$ 97 and will output from ports located at the angle $j\Delta\theta_o$ 93 A signal at the even wavelength 76

$$\lambda_{even}=\lambda_2+2j\Delta\lambda$$

is inputted at the second input port 74 with angle $p\Delta\theta_i+\Delta\theta_o/2$ 127 and will output from ports located at the angle $-j\Delta\theta_o$ 129.

Figure 9A:
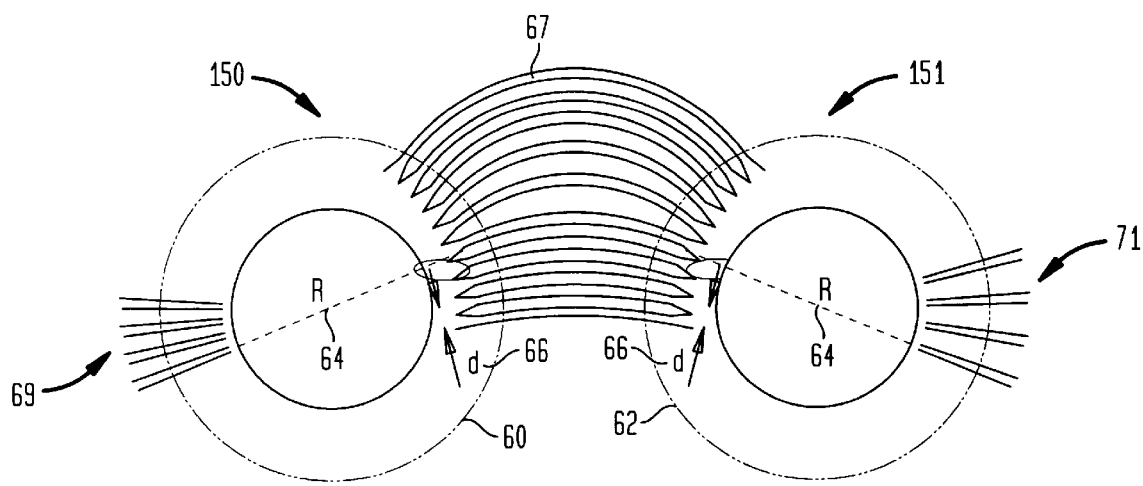
FIG. 9a, 9b and 9c are schematic diagrams showing the application and operation of fourth embodiment 2×N WGR.
Figure 9B:
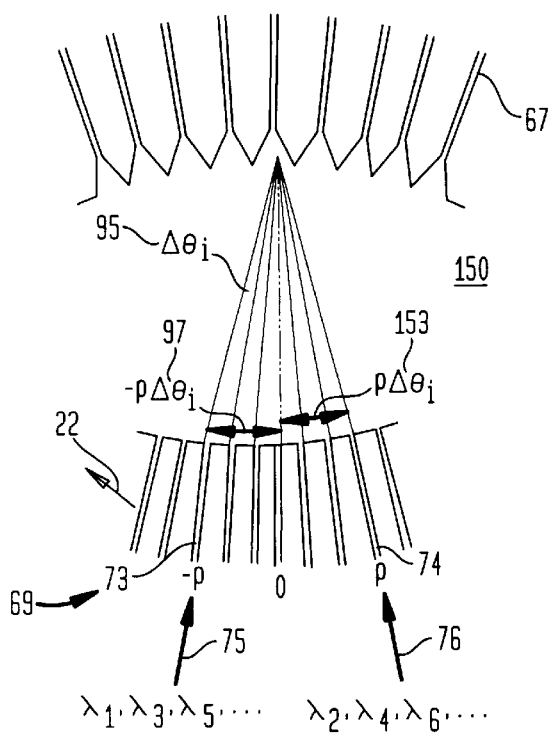
Figure 9C:
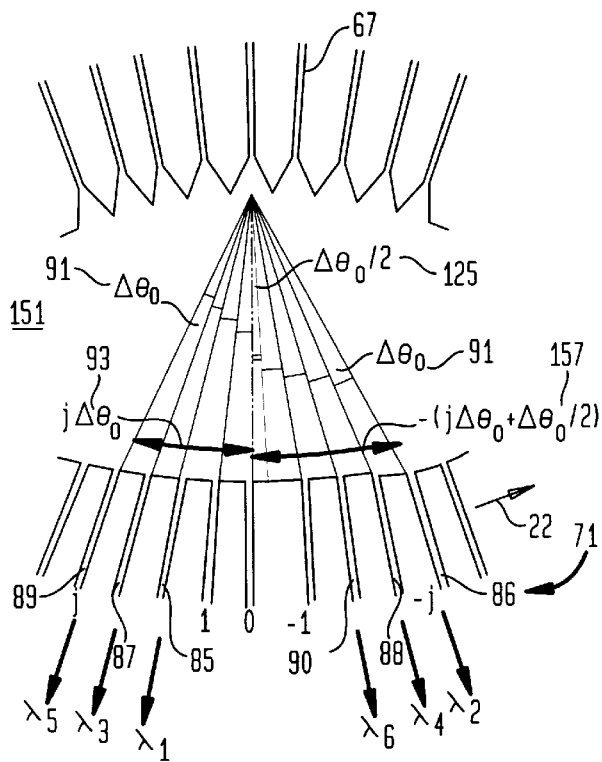

In FIGS. 9a, 9b and 9c, for the first input port 73, angular spacing $\Delta\theta_o$ 95 is designed to satisfy the equation (2). A signal at the odd wavelength 75

$$\lambda_{odd}=\lambda_1+2j\Delta\lambda$$

is inputted at the first input port 73 with input angle $-p\Delta\theta_i$ 97 and will output from ports located at the angle $j\Delta\theta_o$ 93. A signal at the even wavelength 76

$$\lambda_{even}=\lambda_2+2j\Delta\lambda$$

is inputted at the second input port 74 with angle $p\Delta\theta_i$ 153 and will output from ports located at the angle $-(j\Delta\theta_o+\Delta\theta_o/2)$ 157.

While the invention has been described in detail in connection with the preferred embodiments know at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. An optical signal device comprising:
   a first waveguide input for receiving an optical signal having a first set of wavelengths;
   a second waveguide input for receiving an optical signal having a second set of wavelengths, wherein at least a part of said first set of wavelengths and a part of said second set of wavelengths are interleaved;
   a first set of waveguide output ports corresponding to said first waveguide input port and operationally connected to said first waveguide input port through a first slab coupler, a waveguide grating and a second slab coupler; and
   a second set of waveguide output ports corresponding to said second waveguide input port operationally connected to said first waveguide input port through said second slab coupler, said waveguide grating and said first slab coupler.

2. The device as claimed in claim 1
   wherein said first waveguide input is on a first side of a said waveguide grating and
   wherein said second waveguide input is on a second side of said waveguide grating and
   wherein said first side and said second side are on opposite sides of said waveguide grating.

3. The device as claimed in claim 2 wherein said first set of interleaved wavelengths has a channel spacing of $2\Delta\lambda$.

4. The device as claimed in claim 2 wherein said second set of interleaved wavelengths has a channel spacing of $2\Delta\lambda$.

5. The device as claimed in claim 2 wherein said first input and first set of corresponding outputs has a constant angular spacing $\Delta\theta_o$ associated therewith that satisfies the relationship $$dn_s\sin(-p\Delta\theta_i)+dn_s\sin(j\Delta\theta_o)+n_c\Delta L=m\lambda_{odd}$$

and a constant angular spacing $\Delta\theta_o$ satisfies the relationship $$\Delta\theta_o = \frac{2\Delta\lambda}{dn_s}m$$

where p is an input port numbering relative to the central part:
   j is an output port numbering relative to a central port;
   $n_s$ and $n_c$ are effective refractive index of a respective slab coupler and channel waveguide, respectively;
   d is a grating pitch; and
   m is a diffraction order and is an integer;
   $\theta_i=(-p\Delta\theta_i)$ is a diffraction angle at said slab coupler;
   $\Delta L$ is a constant optical length difference between neighboring array waveguides;
   $\lambda_{odd}$ represents a set of wavelengths with a channel spacing $2\Delta\lambda$;
   $\Delta\theta_o$ is a constant output angular spacing; and
   $\Delta\theta_o$ is a constant input angular spacing.

6. The device as claimed in claim 2, wherein said second waveguide input port and said second set of second waveguide output ports have a constant angular shift of $\Delta\theta_o/2$ associated therewith.

7. The device as claimed in claim 2 wherein said second waveguide input port and said second set of waveguide output ports which correspond thereto satisfy the following relationship $$dn_s\sin(-p\Delta\theta_i)+dn_s\sin(j\Delta\theta_o+\Delta\theta_o/2)+n_c\Delta L=m\lambda_{even}$$

and have a constant angular spacing $\Delta\theta_o$ satisfies the relationship $$\Delta\theta_o = \frac{2\Delta\lambda}{dn_s}m$$

where j is an output port numbering relative to a central port;

$n_s$ and $n_c$ are effective refractive index of a respective slab coupler and channel waveguide, respectively;

d is a grating pitch;

m is a diffraction order and is an integer;

$\theta_i=(-p\Delta\theta_i)$ is a diffraction angle at said slab coupler;

p is an integer and is an input number relative to a central port;

$\Delta L$ is a constant optical length difference between neighboring array waveguides;

$\lambda_{even}$ represents a set of wavelengths with a channel spacing $2\Delta\lambda$;

$\Delta\theta_o$ is a constant output angular spacing value; and $\Delta\theta_i$ is a constant input angular spacing value.

8. The device as claimed in claim 2 further comprising input waveguides associated with said second waveguide input port that have a diffraction angle of $\theta_i=-(p\Delta\theta_i)+\Delta\theta_o/2)$ at said second slab coupler disposed on a second side of said arrayed waveguide gratings, which shifts $\Delta\theta_o/2$, a constant angular value relative to a central zero line of said wavelength grating.

9. The device as claimed in claim 2 wherein said second set of waveguide output ports have a same constant angular spacing $\Delta\theta_o$ which corresponds to a set of output wavelengths and wherein said second waveguide input port and its corresponding second set of waveguide output ports satisfy the following grating equation $$dn_s\sin(-(p\Delta\theta_i+\Delta\theta_o/2))+dn_s\sin(j\Delta\theta_o)+n_c\Delta L=m\lambda_{even}$$

where j is an output port numbering relative to a central port;

$n_s$ and $n_c$ are effective refractive index of a respective slab coupler and channel wave guide, respectively;

d is a grating pitch;

m is a diffraction order and is an integer;

$\theta_i=-(p\Delta\theta_i)+\Delta\theta_o/2)$ is a diffraction angle at said slab coupler;

p is an integer and is an input number relative to a central port;

$\lambda_{even}$ represents a set of wavelengths with a channel spacing $2\Delta\lambda$;

$\Delta L$ is a constant optical length difference between neighboring array waveguides;

$\Delta\theta_o$ is a constant output angular spacing value; and $\Delta\theta_o$ is a constant input angular spacing value.

10. The device as claimed in claim 2 wherein said first side and said second side are on the same side of said waveguide grating.

11. The device as claimed in claim 10, wherein said second waveguide input port and said second set of waveguide output ports which correspond thereto have a constant angular shift of $\Delta\theta_o/2$ associated therewith.

12. The device as claimed in claim 1 further comprising a third waveguide input for receiving a third set of wavelengths;

a fourth waveguide input for receiving a fourth set of wavelengths, wherein at least a part of said first set of wavelengths, a part of second set of wavelengths, a part of said third set of wavelengths and a part of said fourth set of wavelengths are interleaved;

a third set of waveguide output ports corresponding to said third waveguide input port; and a fourth set of waveguide output ports corresponding to said fourth waveguide input port.

* * * * *